(12) United States Patent
Webster

(10) Patent No.: US 7,931,136 B2
(45) Date of Patent: Apr. 26, 2011

(54) JAM SENSOR FOR SHOPPING CART CONVEYOR

(75) Inventor: Mark R. Webster, Hubertus, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 457 days.

(21) Appl. No.: 12/059,453

(22) Filed: Mar. 31, 2008

(65) Prior Publication Data

US 2009/0242355 A1  Oct. 1, 2009

(51) Int. Cl.
*B66B 31/00* (2006.01)
(52) U.S. Cl. .................................... 198/323; 198/322
(58) Field of Classification Search .................. 198/301,
198/322, 323, 718, 732; 104/172.1, 172.3, 104/128; 186/58
See application file for complete search history.

(56) References Cited

U.S. PATENT DOCUMENTS

| | | | |
|---|---|---|---|
| 2,109,210 A | 2/1938 | Dunlop | |
| 2,802,427 A | 8/1957 | Costa | |
| 2,965,049 A | 12/1960 | Royer | |
| 3,305,064 A | 2/1967 | Mullis et al. | |
| 3,318,432 A | 5/1967 | Mullis et al. | |
| 3,395,784 A | 8/1968 | Kanarek | |
| 3,446,315 A | 5/1969 | Close | |
| 3,580,376 A | 5/1971 | Lushbough | |
| 3,655,013 A | 4/1972 | Weller | |
| 3,656,636 A | 4/1972 | Konstantin | |
| 3,799,327 A * | 3/1974 | Schulz | 198/718 |
| 3,861,514 A | 1/1975 | Ling | |
| 3,947,832 A | 3/1976 | Rosgen et al. | |
| 4,004,680 A * | 1/1977 | Warmann | 198/732 |
| 4,206,708 A | 6/1980 | Behle | |
| 4,235,327 A | 11/1980 | Heusler et al. | |
| 4,326,622 A | 4/1982 | Ellzey | |
| 4,438,830 A | 3/1984 | Born | |
| 4,518,072 A | 5/1985 | Muellner et al. | |
| 4,681,207 A | 7/1987 | Goto et al. | |
| 5,099,977 A * | 3/1992 | Hirose et al. | 198/323 |
| 5,472,075 A * | 12/1995 | Yamashita et al. | 198/324 |
| 5,473,991 A * | 12/1995 | Crum | 104/172.3 |
| 5,476,156 A | 12/1995 | Gerber | |

(Continued)

FOREIGN PATENT DOCUMENTS

CH        403224    11/1965

(Continued)

*Primary Examiner* — Douglas A Hess
(74) *Attorney, Agent, or Firm* — Michael Best & Friedrich LLP

(57) ABSTRACT

A shopping cart conveyor system is designed to shut the system down in the event that a shopping cart becomes jammed. The system includes a track operable to guide a shopping cart between a first location and a second location, and a drive assembly for moving a shopping cart along the track. The drive assembly includes engagement members movable relative to the track and operable to engage and move a shopping cart from the first location to the second location, and a drive motor (e.g., an electric motor) operable to provide movement to the engagement members. A force sensor detects a parameter (e.g., motor current) of the drive assembly corresponding with a force required to move the engagement members. A controller receives information regarding a frequency of change in the parameter and compares that information to a known value (e.g., a frequency of the engagement members). Preferably, the controller is programmed to stop the drive motor when the frequency of change of the parameter falls within a certain range of the parameter (e.g., frequency of the engagement members).

15 Claims, 7 Drawing Sheets

U.S. PATENT DOCUMENTS

| | | |
|---|---|---|
| 5,572,930 A | 11/1996 | Hein |
| 5,785,165 A | 7/1998 | Stahlhut |
| 5,923,005 A | 7/1999 | Blondiau et al. |
| 5,996,767 A | 12/1999 | Misawa |
| 6,138,815 A | 10/2000 | Reiners et al. |
| 6,334,522 B2 | 1/2002 | Haruta et al. |
| 6,378,693 B1 * | 4/2002 | Ballestrazzi et al. .......... 198/732 |
| 6,435,099 B2 * | 8/2002 | Gunter .......................... 104/162 |
| 6,490,979 B1 * | 12/2002 | Pfleger et al. .............. 104/172.3 |
| 6,644,210 B1 * | 11/2003 | Pfleger et al. .............. 104/172.3 |
| 6,659,230 B1 * | 12/2003 | Jenkins ........................ 187/202 |
| 6,662,933 B2 * | 12/2003 | De Guglielmo et al. ..... 198/732 |
| 7,453,358 B2 * | 11/2008 | Webster .................... 340/568.5 |

FOREIGN PATENT DOCUMENTS

| | | |
|---|---|---|
| DE | 1249765 | 9/1967 |
| DE | 2456791 | 8/1976 |
| DE | 2916818 | 11/1980 |
| EP | 0012149 | 6/1980 |

* cited by examiner

JAM SENSOR FOR SHOPPING CART CONVEYOR

BACKGROUND

The present invention relates to a tow conveyor for moving shopping carts between two different floors of a building. More specifically, the present invention relates to an inclined shopping cart conveyor that can be positioned adjacent to a people-moving escalator such that the shopping cart conveyor moves the shopping carts between two different floors of a building to coincide with the movement of the shoppers.

Currently, many large department stores occupy single-floor buildings that include many different product departments and thus have a footprint that covers tens of thousands of square feet. In these large department stores, shoppers typically use shopping carts to carry selected merchandise throughout the store while the shopper continues to select merchandise from the various departments within the store. Since a shopper may be selecting a large number of items having substantial weight, shopping carts are essential in the current department store environment.

Large single-floor department stores are often located in suburban areas where enough land is available to build a store large enough to include all of the merchandise to be offered by the retailer. Many large department store chains have been unable to open stores in populated urban areas due to the unavailability of large blocks of land for single-floor retail space. In these same urban areas, there are often a number of smaller land lots or multi-floor vacant buildings that would be large enough to accommodate the floor space required by the department store.

Additionally, many department stores prefer a single checkout location where all shoppers enter or exit the store. For these and other reasons, a multi-floor department store that is capable of utilizing shopping carts and having a single checkout location is desirable.

U.S. Pat. No. 6,490,979 filed Dec. 10, 2002 discloses an inclined shopping cart conveyor system and is hereby incorporated by reference.

SUMMARY OF THE INVENTION

The present invention provides a shopping cart conveyor system that is designed to shut the system down in the event that a shopping cart becomes jammed. The system comprises a track operable to guide a shopping cart between a first location and a second location, and a drive assembly for moving a shopping cart along the track. The drive assembly comprises a plurality of engagement members movable relative to the track and operable to engage and move a shopping cart from the first location to the second location, and a drive motor (e.g., an electric motor) operable to provide movement to the engagement members. A force sensor detects a parameter (e.g., motor current) of the drive assembly corresponding with a force required to move the engagement members. A comparator receives information regarding a frequency of change in the parameter and compares that information to a known value (e.g., a frequency of the engagement members). Preferably, a controller is programmed to stop the drive motor when the frequency of change of the parameter falls within a certain range of the parameter (e.g., frequency of the engagement members).

The system of the present invention can be operated by a unique method. The method includes engaging at least one engagement member with a shopping cart, activating the drive assembly (e.g., operating a drive motor) to move the engaging members (resulting is movement of the shopping cart, detecting a parameter of the drive assembly (e.g., sensing a current of the drive motor) corresponding with a force required to move the engagement members, determining a frequency of change of the parameter, and comparing the frequency to a known value (e.g., a frequency of the engagement members). Preferably, the method further includes stopping movement of the engagement members when the frequency of change of the parameter falls within a range of the known value.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
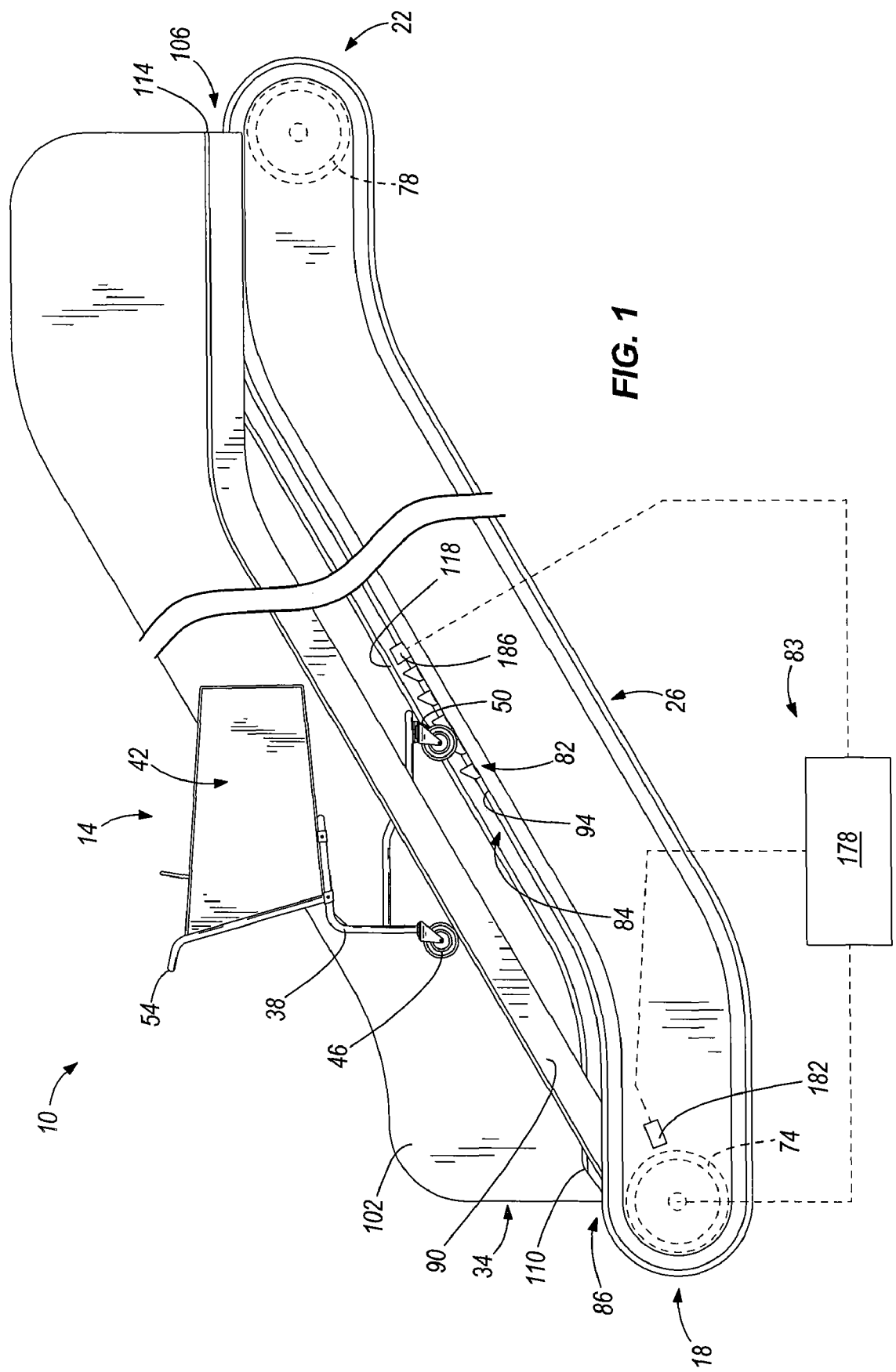
FIG. 1 is a side view of a shopping cart conveyor system.

FIG. 1 shows a shopping cart conveyor system 10 that moves a shopping cart 14 between a first level and a second level. The illustrated shopping cart conveyor system 10 includes a conveyor assembly 26 and a frame 34.

The illustrated shopping cart 14 is similar to those found in typical retail stores and includes a cart frame 38, an item holding area 42 attached to the cart frame 38, four wheels 46 attached to the cart frame 38, and a support bar 50. The cart frame 38 is constructed of bent metal tube sections and defines a handle portion 54 that a user may use to control the shopping cart 14. The cart frame 38 also supports the other components of the shopping cart 14.

The item holding area 42 is constructed from plastic and wire, and includes four cart side walls and a cart bottom such that items may be placed into the item holding area 42 and inhibited from inadvertently leaving the item holding area 42.

The item holding area 42 and the cart frame 38 are designed such that they can support the items placed into the item holding area 42.

The four wheels 46 roll over the ground and allow a user to easily maneuver the shopping cart 14. The rear two wheels 46 are held in a fixed forward direction and the front two wheels 46 are free to rotate. In other constructions, all the wheels 46 may be fixed or free to rotate. In addition, more than four wheels 46 or less than four wheels 46 may be attached to the cart frame 38.

In other constructions, a different shopping cart may be used with the shopping cart conveyor system 10. Many other shopping cart designs exist as is well known by those skilled in the art.

Figure 3:
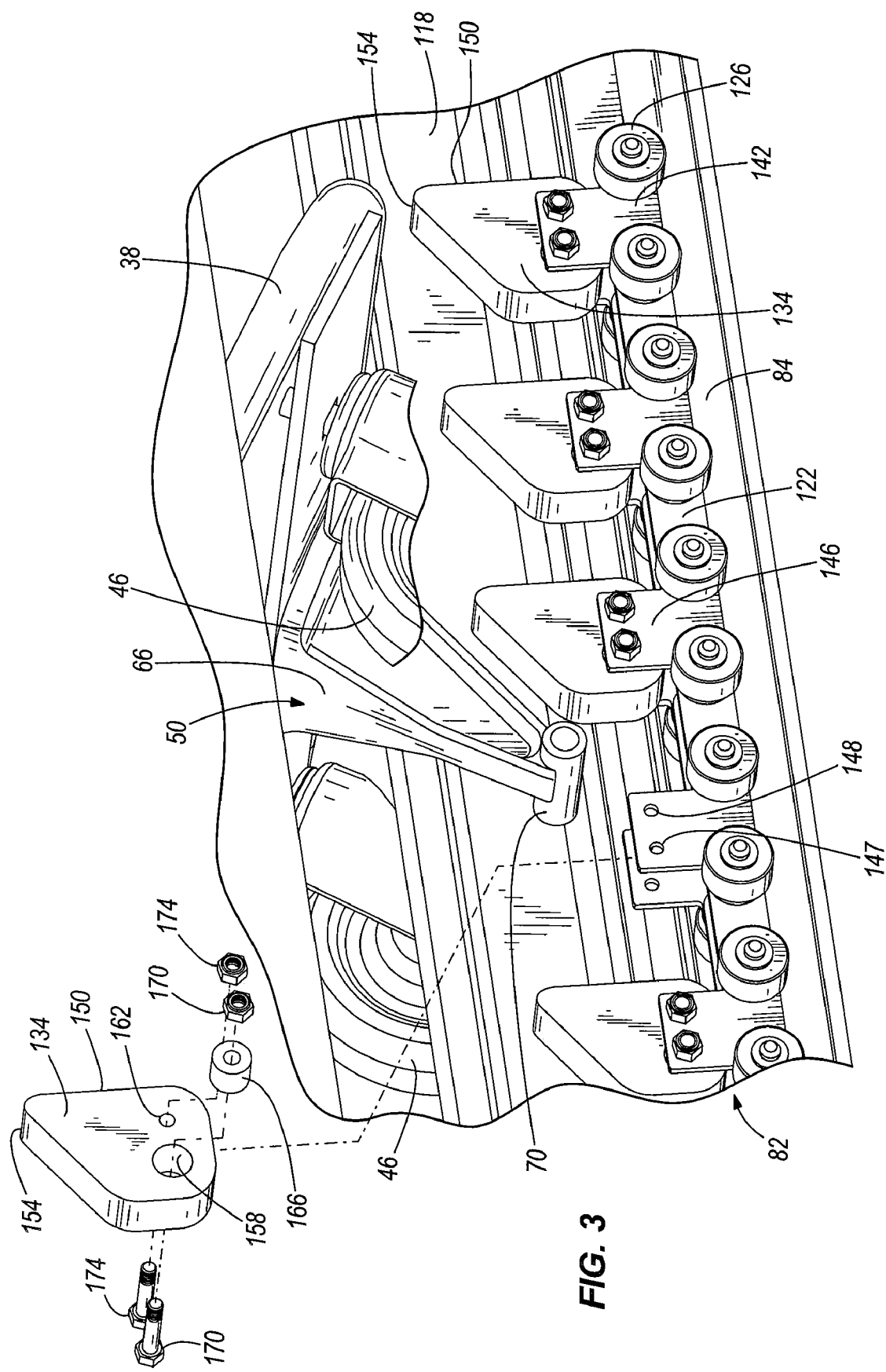
FIG. 3 is an enlarged partial view of the shopping cart conveyor system of FIG. 2 with an engagement member exploded from a conveyor chain assembly.

As is best seen in FIG. 3, the support bar 50 is attached to the cart frame 38 between the front two wheels 46 and is directly connected to the cart frame 38 with two fasteners. The support bar 50 includes a reinforcing section 66 that extends away from the cart frame 38 toward the ground and a cross bar section 70 that extends from the reinforcing section 66 parallel to the ground. In other constructions, the support bar 50 may be formed as a single piece with the cart frame 38 or may include a plurality of separate pieces coupled together to form the support bar 50. In addition, the support bar 50 may be positioned at different angles with respect to the ground. Furthermore, the support bar 50 may be directly connected to the cart frame 38 in other ways (e.g. welding).

With continued reference to FIG. 1, the illustrated conveyor assembly 26 includes a drive motor 72 (FIG. 6), a driven roller 74 coupled to the drive motor 72 with a gear reducer (not shown), an idler roller 78, and a conveyor chain assembly 82 coupled to and supported by the driven roller 74 and the idler roller 78. The drive motor 72 is controlled by a control system 83 such that the driven roller 74 is turned via the gear reducer and turns at a substantially equal speed throughout operation of the conveyor assembly 26. In other constructions, a drive belt, a chain, or another component may couple the drive motor 72 to the driven roller 74. In addition, the drive motor 72 may be directly connected to the driven roller 74.

The driven roller 74 and idler roller 78 are supported by conveyor supports (not shown) of the frame 34. In other constructions, a plurality of support rollers are supported by the frame 34 and guide the conveyor chain assembly 82 such that it follows a desired path.

The illustrated conveyor chain assembly 82 engages the support bar 50 such that the shopping cart 14 is moved by the conveyor assembly 26 between the first level and the second level. The conveyor chain assembly 82 is guided by a guide track 84 of the frame 34 along the desired path. In other constructions, the conveyor chain assembly 82 may be a belt that is guided by the support rollers.

The illustrated frame 34 includes a loading portion 86 at the first level, a pair of rear wheel tracks 90, a pair of front wheel tracks 94, the guide track 84, a side wall 102, and an unloading portion 106 at the second level. The illustrated loading portion 86 is substantially level and provides an area for the user to easily push the shopping cart 14 onto the conveyor assembly 26. In other constructions, the loading portion 86 may be at a different elevation or angle with respect to the ground as well as different lengths and widths.

The pair of rear wheel tracks 90 support the rear wheels 46 of the shopping cart 14 such that the rear wheels 46 may roll on the rear wheel tracks 90 while the shopping cart 14 is moving between the first level and the second level. The pair of front wheel tracks 94 support the front wheels 46 of the shopping cart 14 such that the front wheels 46 may roll on the front wheel tracks 94 while the shopping cart 14 is moving between the first level and the second level. The front wheel tracks 94 are positioned in relation with the rear wheel tracks 90 such that the shopping cart 14 is supported in a substantially level position while the shopping cart 14 is moving between the first level and the second level. In other constructions, the shopping cart 14 may be supported at other angles as desired. In addition, the rear wheel tracks 90 and the front wheel tracks 94 may be positioned at different widths to accommodate different shopping carts.

The guide track 84 receives the support bar 50 of the shopping cart 14 and houses the conveyor chain assembly 82. The guide track 84 extends the length of the shopping cart conveyor system 10 from the first level to the second level and defines a first end 110 at the loading portion 86, a second end 114 at the unloading portion 106, and a cover portion 118 between the first end 110 and the second end 114.

The first end 110 is shaped such that the cross bar section 70 of the support bar 50 may enter the guide track 84 and engage the conveyor chain assembly 82. The second end 114 is shaped such that the conveyor chain assembly 82 may disengage the cross bar section 70 of the support bar 50 and the shopping cart 14 may exit the shopping cart conveyor system 10.

Figure 5:
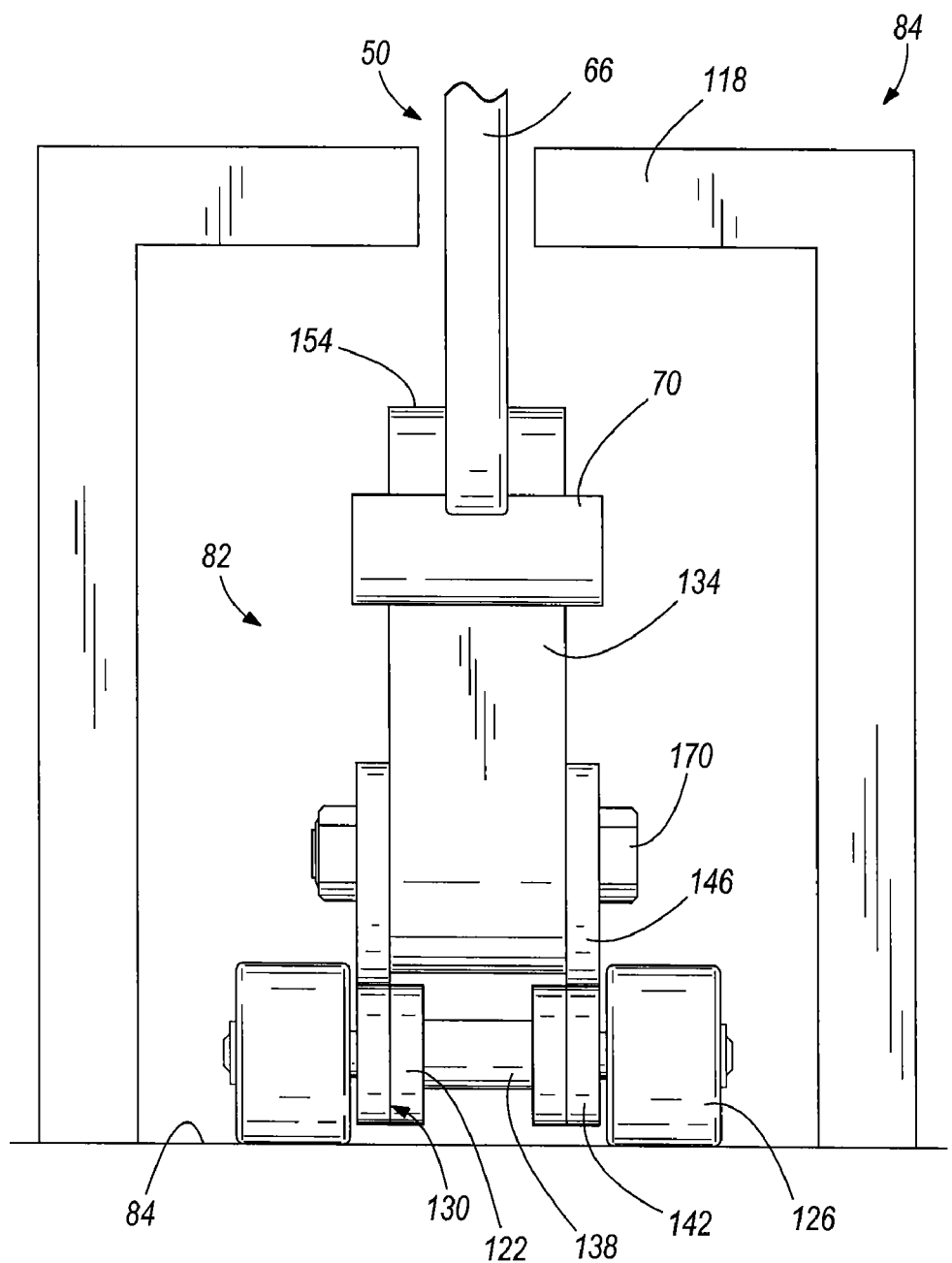
FIG. 5 is a partial sectional view of the shopping cart conveyor system taken at the section line 5-5 in FIG. 4.

The support bar 50 extends through the cover portion 118 such that the cross bar section 70 is disposed within the guide track 84 and is not substantially visible from outside the guide track 84. As shown in FIG. 5, the cover portion 118 substantially covers the conveyor chain assembly 82 such that access to the conveyor chain assembly 82 in the cover portion 118 is inhibited. The cover portion 118 also aligns the shopping cart 14 on the front wheel tracks 94 and the rear wheel tracks 90 such that the shopping cart 14 moves between the first level and the second level in a substantially straight line on the desired path. In other constructions, the guide track 84 may be other shapes with the conveyor chain assembly 82 uncovered.

The side wall 102 extends the length of the shopping cart conveyor system 10 and is positioned such that access from the side is inhibited. In other constructions, more than one side wall 102 may be included or the side wall 102 may be removed.

Figure 2:
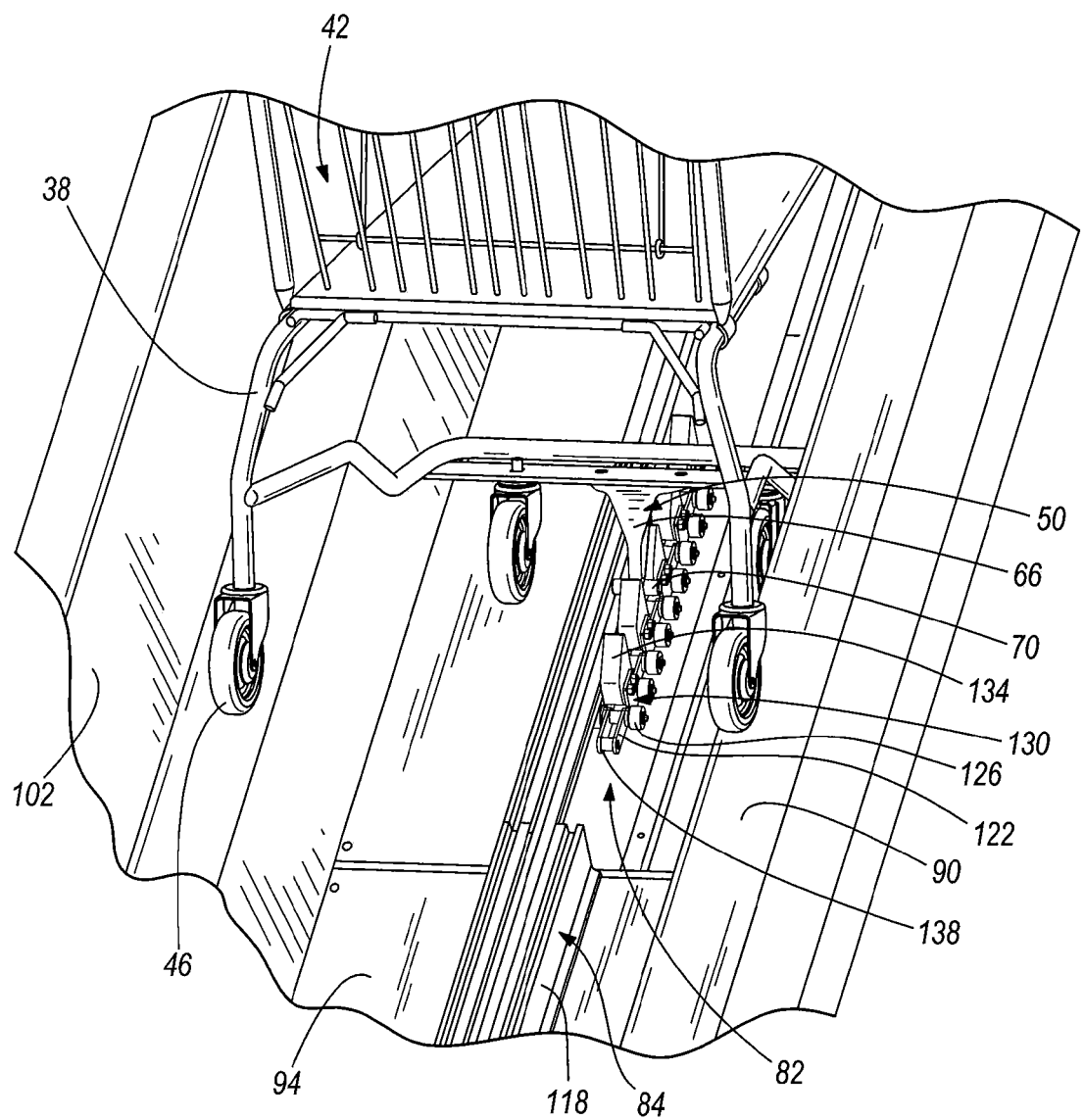
FIG. 2 is a partial rear perspective view of the shopping cart conveyor system of FIG. 1.

Turning now to FIGS. 2 and 3, a portion of the guide track 84 has been cut away such that a portion of the conveyor chain assembly 82 is visible. The conveyor chain assembly 82 includes chain link members 122, rollers 126, mounting members 130, and engagement members 134. The chain link members 122 connect the mounting members 130 together such that the conveyor chain assembly 82 may flex around the driven roller 74 and the idler roller 78 to form a continuous chain that is flexible about pivots 138. The rollers 126 are mounted on the pivots 138 on both sides of the conveyor chain assembly 82 and roll on the guide track 84 so as to maintain the conveyor chain assembly 82 in contact with the desired path. Fasteners hold the rollers 126 to the pivots 138 such that the rollers 126 may rotate.

The mounting members 130 include a chain portion 142 and an attachment portion 146. The chain portion 142 connects at the pivot 138 to the chain link members 122 and the attachment portion 146 defines a first attachment aperture 147 and a second attachment aperture 148. In other constructions, less than two apertures or more than two apertures are conceivable.

The engagement members 134 include a front surface 150, a top portion 154, a first aperture 158, a second aperture 162, and a biasing element 166. The engagement members 134 are attached to the mounting members 130 by aligning the first aperture 158 and the second aperture 162 of each engagement member 134 with the first attachment aperture 147 with the second attachment aperture 148, respectively, of each mounting member. The biasing element 166 is an elastomeric ring and is positioned in the first aperture 158. A first fastener 170 is inserted through the first aperture 158, the biasing element 166, and the first attachment aperture 147 such that the engagement member 134 is secured. A second fastener 174 is engages the second aperture 162 and the second attachment aperture 148 such that the second aperture 162 and the second attachment aperture 148 are inhibited from inadvertently becoming misaligned. In other constructions, the biasing element 166 can be other elements such as a spring, a linear extension, a leaf spring, or other biasing device. In addition, the biasing element 166 may be positioned at least partially outside the first aperture. Furthermore, the first fastener 170 and the second fastener 174 could be other fasteners or any number of fasteners.

Figure 4:
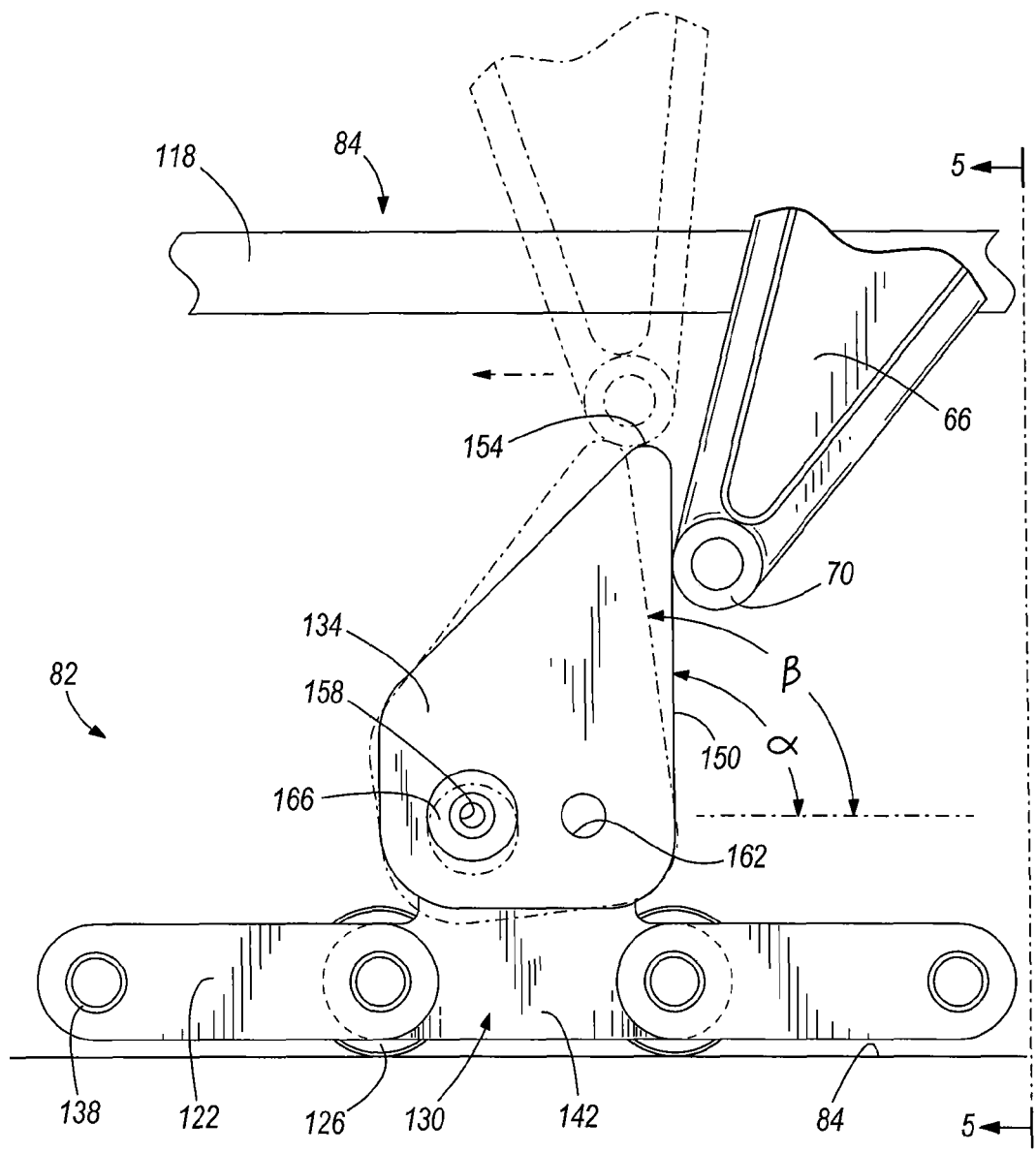
FIG. 4 is an enlarged side view of the engagement member in a first position and a second position, with fasteners removed for clarity.

As is best seen in FIG. 4, each engagement member 134 is rotatable between a first position (solid lines in FIG. 4) and a second position (broken lines in FIG. 4). In the first position, the front surface 150 forms an acute angle α with respect to the direction of motion of the conveyor chain assembly 82. While in the first position, the front surface 150 engages the support bar 50 of a shopping cart 14 and moves the shopping cart 14 with the engagement member 134 such that the shopping cart 14 follows the desired path and moves from the first level to the second level. In the illustrated embodiment the angle α is about 85 degrees. It should be understood that the precise angle α can vary considerably from the angle listed above. The goal is to make sure the engagement member 134 is able to move the shopping carts under normal operating conditions.

If the shopping cart 14 becomes jammed or is otherwise inhibited from moving, the engagement member 134 pivots about the second fastener 174 in the second aperture 162 to the second position in which the front surface 150 forms an obtuse angle β with respect to the direction of motion of the conveyor chain assembly 82. While in the second position, the support bar 50 can disengage from the front surface 150 and slide over the top portion 154 while the cross bar section 70 is still disposed within the guide track 84 and the biasing element 166 is compressed. This allows a shopping cart 14 that is jammed to disengage from the conveyor chain assembly 82 such that it does not damage the conveyor chain assembly 82, the shopping cart 14, or any other components of the shopping cart conveyor system 10. In the illustrated embodiment, the angle β is greater than 90 degrees. In other constructions, the first position and second position may form other angles. The precise angle at which the shopping cart will rise and disengage the engagement member depends on a variety of factors, such as the friction between the front surface 150 and the support bar 50. Furthermore, the shape of the engagement member 134 may be different than what is illustrated, and the engagement member 134 can move in other manners (e.g., sliding).

The engagement members 134 may be unbolted from the conveyor chain assembly 82 and easily replaced if broken. In addition, the chain link members 122, the mounting members 130, and the rollers 126 may easily be replaced if broken.

In one construction, the shopping cart conveyor system 10 includes the control system 83 (shown in FIG. 1) that includes a controller 178 that operates the drive motor 72, a first sensor 182 that detects a parameter of the drive assembly (i.e. drive motor 72, conveyor chain assembly 82, rollers 74, 78, etc.) corresponding with a force required to move the engagement members. A second sensor 186 detects the presence of engagement members 134 passing the second sensor 186.

The first sensor 182 sends a first signal 190 to the controller 178 indicative of the detected parameter of the drive assembly, and the second sensor 186 sends a second signal 194 to the controller 178 indicative of the presence of engagement members 134.

Figure 6:
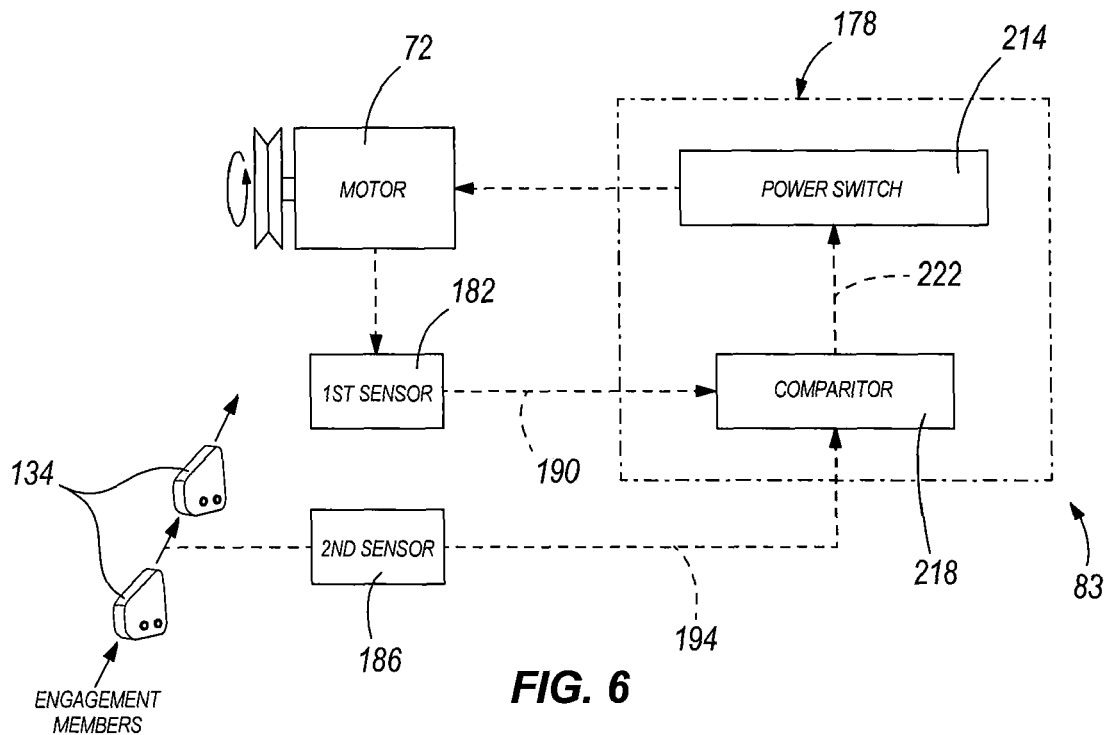
FIG. 6 is a schematic representation of a control system for the shopping cart conveyor system according to the invention.

The controller 178, the drive motor 72, the first sensor 182, and the second sensor 186 are schematically represented in FIG. 6. The illustrated first sensor 182 is an analog sensor that detects the current draw of the drive motor 72 and sends the first signal 190 that is indicative of the current draw. During normal operating conditions, the first signal 190 will fluctuate slowly and steadily as more or less shopping carts 14 are moved by the shopping cart conveyor system 10. For example, as more shopping carts 14 are loaded onto the shopping cart conveyor system 10, the drive motor 72 will have a larger current draw. As such, it can be seen that the first sensor detects a parameter (i.e., current draw) that generally corresponds with a force required to move the engagement members.

Figure 7:
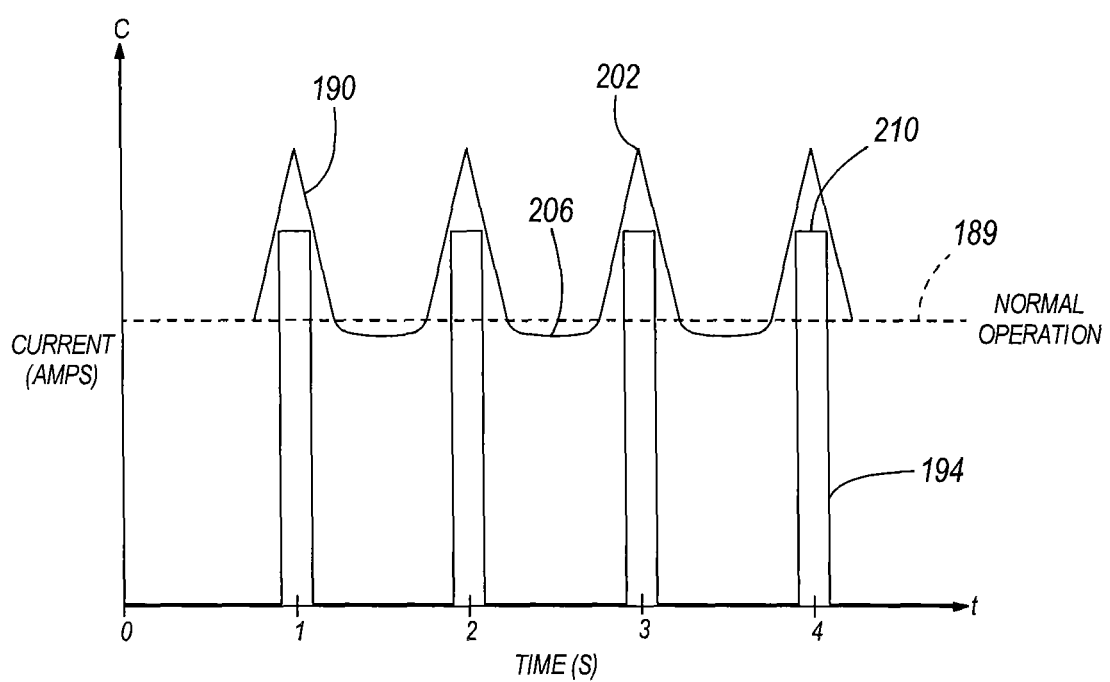
FIG. 7 is a plot of a first signal and a second signal with respect to time as determined by the control system of FIG. 6.

FIG. 7 is an example of the first signal 190 and the second signal 194, plotted with respect to time. In general, during normal operation, the current draw will have a relatively steady value with respect to time, as represented by a dashed line 189 indicative of the first sensor's 182 output during normal operation. When the shopping cart 14 becomes jammed, the current draw will spike each time the engagement member 134 engages the cross bar section 70 and will fall each time the engagement member 134 pivots to the second position and allows the cross bar 70 to slide over the top portion 154 of the engagement member 134 (see FIG. 7). This spike and fall pattern that occurs when a shopping cart 14 is jammed causes a peak 202 and a valley 206 in the first signal 190 that may be viewed on the current draw versus time plot (FIG. 7). In other constructions, the first sensor 182 may be a digital sensor configured to send a signal when a predetermined peak threshold is reached. In addition, an analog to digital converter may be used to convert the first signal 190 into a digital signal. Furthermore, other sensor alternatives are conceivable as is known by those skilled in the art. In still other constructions, the first sensor 182 may detect a torque output of the drive motor 72 and send a signal indicative of the torque output to the controller 178, a strain output of the conveyor chain assembly 82 and send a signal indicative of the strain or tension of the conveyor chain assembly 82, or any other relevant parameter (e.g., voltage, force, etc.) of the drive assembly.

The illustrated second sensor 186 is a digital sensor that detects the presence of the engagement members 134 and sends the second signal 194 that is indicative of the presence of engagement members 134 to the controller 178. For example, referring to FIG. 7, the second sensor 186 may send a high signal 210 when the presence of the engagement member 134 is detected. In one construction, the second sensor 186 is an optical sensor that identifies when the engagement member 134 is present and sends the second signal 194 that may be plotted with respect to time. As illustrated in FIG. 7, each high signal 210 indicates that the engagement member 134 is sensed by the second sensor 186. In other constructions, the second sensor 186 may be another kind of sensor (e.g. an I.R. pickup, a mechanical switch, a reflectivity sensor, etc.) as is known by those skilled in the art. In addition, the second sensor 186 may be an analog sensor and send a second analog signal. Furthermore, the second sensor 186 may send the second signal 194 that is a low digital signal when the presence of the engagement member 134 is detected.

The illustrated controller 178 includes a power switch 214 and a comparator 218 that receives the first signal 190 and the second signal 194. The comparator 218 compares the first signal 190 and the second signal 194 with respect to time to determine if the shopping cart 14 is jammed. If the peaks 202 of the first signal 190 match the frequency of the high signals 210 of the second signal 194, the controller 178 determines that the shopping cart 14 is jammed. If the comparator 218 determines the shopping cart 14 is jammed, a third signal 222 is sent to the power switch 214. The third signal 222 is received by the power switch 214 and the drive motor 72 is stopped such that the jammed shopping cart 14 may be aligned or removed. In other constructions, the controller 178 may have different components or may be another controller type (i.e. programmable logic controller PLC). For example, the comparator 218, the power switch 214, and other elements may be programmed within a PCL that controls the shopping cart conveyor system 10.

Figure 8:
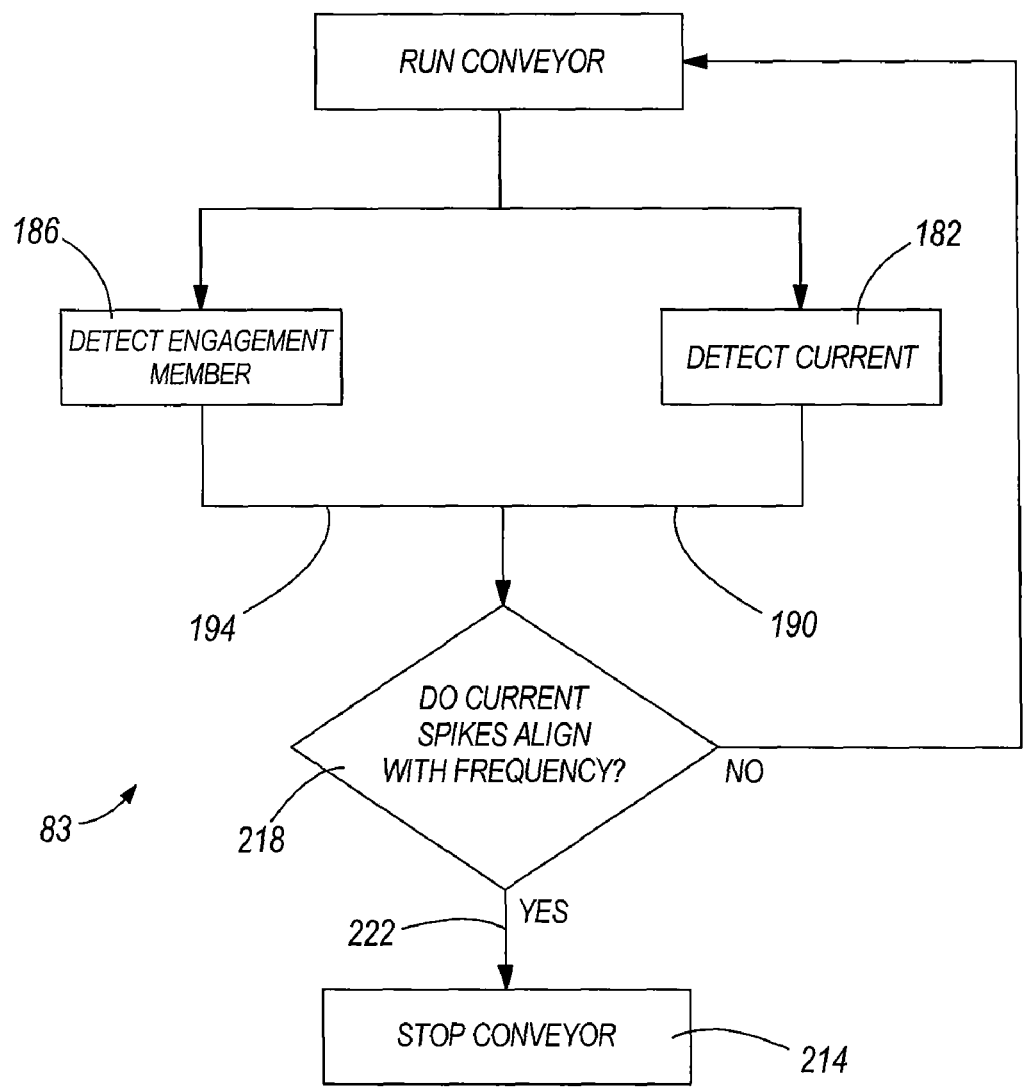
FIG. 8 is a flowchart showing the operation of the control system of FIG. 6.

The flowchart in FIG. 8 illustrates the function of the control system 83. When the shopping cart conveyor system 10 is running, the first sensor 182 sends the first signal 190 that is indicative of the current draw of the drive motor 72 and the second sensor 186 sends the second signal 194 every time one of the engagement members 134 is detected. The comparator 218 receives the first signal 190 and the second signal 194 and determines if a shopping cart 14 is jammed. If a jam is detected, the comparator 218 sends the third signal 222 to the power switch 214. When the power switch 214 receives the third signal 222, the drive motor 72 is stopped until the shopping cart 14 is aligned or removed and the shopping cart conveyor system 10 is restarted. In other constructions, the controller 178 can include a counter that counts instances of consecutive peaks 202 that match the frequency of the high signals 210. When the counter reaches a predetermined number within a predetermined time, the shopping cart conveyor system 10 is stopped. Other control logic can be used according to the invention to determine the existence of the jammed shopping cart 14 as is known by those skilled in the art. In addition, other system parameters may be detected by the first sensor 182, second sensor 186, or other sensors as desired to aid in the detection of the jammed shopping cart 14.

In an alternative embodiment, the first signal 190 produced by the first sensor 182 can be compared to other parameters, instead of the second signal 194. For example, the rate at which engagement members 134 pass a certain location does not fluctuate substantially during operation of the system 83, and thus the rate of fluctuation of the second signal does not change substantially. Because of this, instead of measuring the second signal 194, the system 83 could instead utilize a certain value as an approximation of the rate at which engagement members 134 pass a certain point. This value could be used as a comparison against which the first signal 190 is compared for purposes of determining whether or not there is a jammed shopping cart in the system. This alternative design alleviates the need for the second sensor.

Various features and advantages of the invention are set forth in the following claims.

What is claimed is:

1. A shopping cart conveyor system comprising:
a track operable to guide a shopping cart between a first location and a second location;
a drive assembly for moving a shopping cart along the track, the drive assembly comprising:
a plurality of engagement members movable relative to the track and operable to engage and move a shopping cart from the first location to the second location; and
a drive motor operable to provide movement to the engagement members;
a force sensor for detecting a parameter of the drive assembly corresponding with a force required to move the engagement members; and
a controller programmed to receive information regarding a frequency of change in the parameter and compare that information to a value for making a useful comparison to the information regarding the frequency of change in the parameter.

2. A shopping cart conveyor system as claimed in claim 1, wherein the plurality of engagement members are coupled to an endless flexible member.

3. A shopping cart conveyor system as claimed in claim 2, wherein the flexible member is driven by the drive motor.

4. A shopping cart conveyor system as claimed in claim 1, wherein the drive motor is an electric motor, and wherein the parameter is a current of the drive motor.

5. A shopping cart conveyor system as claimed in claim 1, further comprising a frequency sensor for measuring a frequency of the engagement members.

6. A shopping cart conveyor system as claimed in claim 5, wherein the value comprises the frequency of the engagement members.

7. A shopping cart conveyor system as claimed in claim 6, wherein the controller is programmed to stop the drive motor when the frequency of change of the parameter falls within a certain range of the frequency of the engagement members.

8. A shopping cart conveyor system as claimed in claim 1, wherein the controller is programmed to stop the drive motor when the frequency of change of the parameter falls within a certain range of the value.

9. A method of operating a shopping cart conveyor having a track defining a first location and a second location, a plurality of engagement members movable relative to the track, and a drive assembly that moves the engagement members, the method comprising:
engaging at least one engagement member with a shopping cart;
activating the drive assembly to move the engaging members, resulting is movement of the shopping cart;
detecting a parameter of the drive assembly corresponding with a force required to move the engagement members;
determining a frequency of change of the parameter; and
comparing the frequency to a value for making a useful comparison to the frequency of change in the parameter.

10. A method as claimed in claim 9, wherein the drive assembly includes a drive motor coupled to the engagement members, and wherein activating includes operating the drive motor.

11. A method as claimed in claim 10, wherein the drive motor is an electric motor, and wherein detecting a parameter includes sensing a current of the drive motor.

12. A method as claimed in claim 9, further comprising measuring a frequency of the engagement members.

13. A method as claimed in claim 12, wherein comparing includes comparing the frequency of change of the parameter to the frequency of the engagement members.

14. A method as claimed in claim 13, further comprising stopping movement of the engagement members when the frequency of change of the parameter falls within a range of the frequency of the engagement members.

15. A method as claimed in claim 9, further comprising stopping movement of the engagement members when the frequency of change of the parameter falls within a range of the known value.

* * * * *